United States Patent
Huang et al.

(10) Patent No.: US 7,749,336 B2
(45) Date of Patent: Jul. 6, 2010

(54) TECHNIQUE FOR INCREASING THE COMPLIANCE OF TIN-INDIUM SOLDERS

(75) Inventors: Benlih Huang, New Hartford, NY (US); Hong-Sik Hwang, Clinton, NY (US); Ning-Cheng Lee, New Hartford, NY (US)

(73) Assignee: Indium Corporation of America, Utica, NY (US)

(\*) Notice: Subject to any disclaimer, the term of this patent is extended or adjusted under 35 U.S.C. 154(b) by 0 days.

(21) Appl. No.: 11/360,812

(22) Filed: Feb. 24, 2006

(65) Prior Publication Data

US 2007/0048172 A1    Mar. 1, 2007

Related U.S. Application Data

(60) Provisional application No. 60/712,175, filed on Aug. 30, 2005.

(51) Int. Cl.
    *C22C 13/00*    (2006.01)
(52) U.S. Cl. .................. 148/22; 148/400; 420/560; 420/561; 420/562
(58) Field of Classification Search .......... 148/400, 148/22; 420/560–562
    See application file for complete search history.

(56) References Cited

U.S. PATENT DOCUMENTS

| | | | |
|---|---|---|---|
| 4,929,423 A | 5/1990 | Tucker et al. | |
| 5,256,370 A * | 10/1993 | Slattery et al. | 420/557 |
| 5,405,577 A | 4/1995 | Seelig et al. | |
| 5,435,857 A | 7/1995 | Han et al. | |
| 5,520,752 A | 5/1996 | Lucey, Jr. et al. | |
| 5,527,628 A | 6/1996 | Anderson et al. | |
| 5,580,520 A | 12/1996 | Slattery et al. | |
| 5,833,921 A | 11/1998 | Paruchuri et al. | |
| 5,863,493 A | 1/1999 | Achari et al. | |
| 5,980,822 A | 11/1999 | Moon et al. | |
| 5,985,212 A | 11/1999 | Hwang et al. | |
| 6,050,480 A | 4/2000 | Taguchi et al. | |
| 6,176,947 B1 | 1/2001 | Hwang et al. | |
| 6,228,322 B1 | 5/2001 | Takeda et al. | |
| 6,306,516 B1 * | 10/2001 | Jin et al. | 428/469 |
| 6,365,097 B1 | 4/2002 | Yamashita et al. | |

(Continued)

FOREIGN PATENT DOCUMENTS

CN    1195592    10/1998

(Continued)

OTHER PUBLICATIONS

D. R. Frear et al., "Pb-Free Solders for Flip-Chip Interconnects", JOM, p. 28-38, Jun. 2001.

(Continued)

*Primary Examiner*—Sikyin Ip
(74) *Attorney, Agent, or Firm*—Sheppard Mullin Richter & Hampton LLP

(57) ABSTRACT

A technique for increasing the compliance of tin-indium solders is disclosed. In one particular exemplary embodiment, the technique may be realized as a lead free solder alloy comprising from about 58.0% to about 99.998% by weight tin, from about 0.001% to about 40.0% by weight indium, and from about 0.001% to about 2.0% by weight at least one rare earth element.

7 Claims, 14 Drawing Sheets

U.S. PATENT DOCUMENTS

| | | | |
|---|---|---|---|
| 6,391,123 | B1 | 5/2002 | Nakamura et al. |
| 6,428,911 | B2 | 8/2002 | Kitajima et al. |
| 6,457,632 | B1 | 10/2002 | Teshima et al. |
| 6,554,180 | B1 | 4/2003 | Katoh et al. |
| 6,569,262 | B1 | 5/2003 | Shohji |
| 6,689,488 | B2 | 2/2004 | Yoshitome et al. |
| 6,805,974 | B2 | 10/2004 | Choi et al. |
| 6,843,862 | B2 | 1/2005 | Chew et al. |
| 6,896,172 | B2 | 5/2005 | Tagachi et al. |
| 2002/0063147 | A1 | 5/2002 | Huang et al. |
| 2002/0175403 | A1 | 11/2002 | Sreeram et al. |
| 2004/0070915 | A1 | 4/2004 | Nagai et al. |
| 2004/0187976 | A1 | 9/2004 | Hua |
| 2004/0188503 | A1 | 9/2004 | Hua |
| 2005/0029675 | A1 | 2/2005 | Hua |
| 2005/0031483 | A1* | 2/2005 | Liu et al. .................. 420/513 |
| 2005/0100474 | A1 | 5/2005 | Huang et al. |
| 2005/0153523 | A1 | 7/2005 | Hua |
| 2005/0184369 | A1 | 8/2005 | Sonoda et al. |
| 2007/0048172 | A1 | 3/2007 | Huang et al. |
| 2008/0026240 | A1 | 1/2008 | Funaya et al. |

FOREIGN PATENT DOCUMENTS

| | | | |
|---|---|---|---|
| CN | 1586792 | | 3/2005 |
| EP | 0435009 | | 7/1991 |
| EP | 1180411 | | 2/2002 |
| JP | 5050286 | | 3/1999 |
| JP | 11216591 | | 8/1999 |
| JP | 2002/254298 | | 9/2002 |
| JP | 2003205388 | * | 7/2003 |
| JP | 2005/014076 | | 1/2005 |
| JP | 2005/040847 | | 2/2005 |
| WO | WO 2004/113013 | | 12/2004 |

OTHER PUBLICATIONS

H. Okamoto, "In-Sn (Indium-Tin)", Phase Diagrams of Indium Alloys and their Engineering Applications, Editied by Charles E. T. White and Hiroaki Okamoto, ASM International, p. 255-257, May 1992.
D.A. Porter et al., "Phase Trasformations in Metals and Alloys", p. 24-28, 1981.
I. E. Anderson et al., "Microstructural Modifications and Properties of Sn-Ag-Cu Solder Joints Induced by Alloying", Journal of Electronic Materials, vol. 31, No. 11, p. 1166-1174, 2002.
Lee, Ning-Cheng, "Reflow Soldering Processes and Troubleshooting: SMT, BGA, CSP and Flip Chip Technologies", 2002, pp. 2/19-2/33, Butterworth-Heinemann, Woburn, MA.
Humpston and Jacobson, "Principles of Soldering and Brazing", 1993, pp. 156-166, ASM International, Materials Park, OH.
International Search Report dated Jun. 3, 2008 for Application No. PCT/US06/31776.
International Search Report dated Oct. 3, 2007 for Application No. PCT/US06/47476.
International Search Report dated Mar. 29, 2007 for Application No. PCT/US06/37441.
European Search Report, EP Application No. 06848579.6-2122, dated Nov. 27, 2008.
Amagai, et al., "High Drop Test Reliability: Lead Free Solders", ECTC, S29p7, Jun. 2004.
Anderson et al., Alloying Effects in near-eutectic sn-ag-cu solder Alloys for Improved Microstructural stability, Journal of Electronic Materials, vol. 30, No. 9, 2001, pp. 1050-1059.
Bath et al., Research Update: Lead-free Solder Alternatives, Circuits Assembly, May 2000, pp. 31-40.
Chiu, et al., "Effect of Thermal Aging on Board Level Drop Reliability for Pb-free BGA Packages", ECTC, p. 1256, Jun. 2004.
Date, et al., "Impact Reliability of Solder Joints", ECTC, Jun. 2004.
Date, et al., "Pb-free Solder Ball with Higher Impact Reliability", Intel Pb-free Technology forum, Jul. 18-20, 2005, Penang, Malaysia.
Dieter, Mechanical Metallurgy, McGraw-Hill, Second Edition, 1976, Chapter 6, Sections 6-9, pp. 221-222.
Gregorich, et al., "SnNi and SnNiCu Intermetallic Compounds Found When using SnAgCu Solders", IPC/Soldertec Global $2^{nd}$ International Conference on Lead Free Electronics, Amsterdam, Netherland, Jun. 23, 2004.
Henderson, "On the question of SAC solder alloy—Cu pad solder joint fragility", Webcast Meeting on SAC Solder Joint Fragility, Binghamton, NY, Sep. 2004.
Huang, et al., "Effect of SnAgCu Composition on Soldering Performance", Soldering & Surface Mount Technology, vol. 17, No. 3, p. 9-19, 2005.
Kang et al., Formation of $Ag_3$ Plates in sn-ag-cu alloys and Optimization of Their Alloy Composition, 2003 Electronic Components and Technology Conference, pp. 64-70.
Kattner, Phase diagrams for lead-free solder alloys, Overview, Phase Diagrams, Dec. 2002, pp. 45-51.
Kester—Lead Free Solutions, Lead-Free Frequently Asked Questions, Solder Alloy Selection, pp. 1-3, http://www.kester.com/en-us/leadfree/lfsfaq_alloyselection.aspx, Dec. 10, 2007.
Kim, K.S., et al., "Effects of Fourth Alloying Additive on Microstructures and Tensile Properties of Sn-Ag-Cu Alloy and Joints with Cu", Elsevier—Microelectronics Reliability, vol. 43, pp. 259-267, (2003).
Kondos & S. Mandke, "Kirkendall Voiding in Cu Pads and Other Pad Issues", UIC Fragile SAC Joint Meeting, Binghamton, NY, Oct. 7, 2004.
Lawley, "Atomization The Production of Metal Powders," Monographs in P/M Series No. 1, 1992, pp. 21-43, Library of Congress Cataloging-in-Publication Data, Princeton, NJ.
Moon, K.-W., et al., Experimental and Thermodynamic Assessment of Sn-Ag-Cu Solder Alloy, J. Electron. Mater. 29 (2000) pp. 1122-1236, Metallurgy Division, Materials Science and Engineering Laboratory NIST Gaithersburg, MD , USA.
Saha, et al., "Effect of Intermetallic Phases on Performance in a Mechanical Drop Environment: 96.5Sn3.5Ag Solder on Cu and Ni/Au Pad Finishes", ECTC, S29p5, Jun. 2004.
Syed, "Interaction of Pb free Solder Alloys and Package Pad Finish on Drop/Impact Reliability of CSP packages", Amkor Technology®, Mar. 14, 2006.
Terashima, et al., "Effect of Silver Content on Thermal Fatigue Life of Sn-xAg-0.5Cu Flip-Chip Interconnects", Journal of Electronic Materials, vol. 32, No. 12, p. 1527-1533, 2003.
Wang, L. "Current Status of R&D Projects of Lead-Free Solders", Journal of Materials and Metallurgy, vol. 1, No. 1, 7 pages, (Mar. 2002).
Wassink, Soldering In Electronics—A Comprehensive Treatise on Soldering Technology for Surface Mounting and Through-hole Technique, $2^{nd}$ Edition, 1989, pp. 545-559, Electrochemical Publications Limited, Bristol, England.
Joint Industry Standard, "Requirements for Soldering Pastes," American National Standard ANSI/J-STD-005, Jan. 1995, p. 3, Electronic Industries Association, Arlington, VA, and The Institute for Interconnecting and Packaging Electronic Circuits, Lincolnwood, IL.

* cited by examiner

| In (wt.%) | Sn-In | Sn-In-0.16Ce | Sn-In-0.1La | Sn-In-0.01Nd |
|---|---|---|---|---|
| 0 | 732 | | | |
| 2.5 | 2882 | 3232 | | |
| 5 | 6281 | 5997 | | |
| 7.5 | 6680 | 6108 | | |
| 10.5 | 6710 | 5757 | | |
| 11.5 | 5085 | 4348 | | |
| 13 | 3733 | 3025 | | 2379 |
| 14.7 | 3275 | 3000 | 2538 | 2293 |
| 20 | 3810 | 2958 | | 3073 |
| 28 | 3169 | 3185 | | |
| 40 | 2929 | 2927 | | |

Figure 2

| Alloy | Ductility (%) |
|---|---|
| Pb95Sn5 | 16.1 |
| Sn-5In | 18.9 |
| Sn-5In-0.16Ce | 21.2 |
| Sn-13In | 27.3 |
| Sn-13In-0.08Ce | 31.7 |
| Sn-14.7In | 13.5 |
| Sn-14.7In-0.01Nd | 21.7 |
| Sn-14.7In-0.1La | 22.6 |

Figure 5

| Alloy | Yield Strength (psi) |
|---|---|
| Sn-13In | 3733 |
| Sn-13In-0.32Ce | 3150 |
| Sn-13In-0.16Ce | 3025 |
| Sn-13In-0.08Ce | 3108 |
| Sn-13In-0.04Ce | 3522 |

Figure 6

| Alloy | Yield Strength (psi) |
|---|---|
| Sn-14.7In | 3275 |
| Sn-14.7In-0.27Nd | 2962 |
| Sn-14.7In-0.135Nd | 2959 |
| Sn-14.7In-0.068Nd | 2689 |
| Sn-14.7In-0.034Nd | 2692 |
| Sn-14.7In-0.01Nd | 2293 |
| Sn-14.7In-0.005Nd | 2773 |
| Sn-14.7In-0.002Nd | 2927 |

Figure 7

| Alloy | Yield Strength (psi) |
|---|---|
| Sn-13In | 3733 |
| Sn-13In-0.01Nd | 2379 |

Figure 8

| Alloy | Yield Strength (psi) |
|---|---|
| Sn-14.7In | 3275 |
| Sn-14.7In-0.37La | 3587 |
| Sn-14.7In-0.1La | 2538 |
| Sn-14.7In-0.01La | 3101 |

Figure 9

| Alloy | Yield Strength (psi) |
|---|---|
| Sn-20In | 3810 |
| Sn-20In-0.16Ce | 2958 |
| Sn-20In-0.01Nd | 3073 |

Figure 10

| Alloy | Yield Strength |
|---|---|
| Sn-13In | 3733 |
| Sn-13In-0.1Co | 3311 |
| Sn-13In-0.3Co | 3583 |
| Sn-13-In-0.6Co | 3484 |
| Sn-13In-0.3Co-0.16Ce | 3343 |
| Sn-13In-0.3Co-0.05Ge | 3443 |

Figure 11

| Alloy | Ductility (%) |
|---|---|
| Sn-2.5In-0.06Ce | 13.4 |
| Sn-5In-0.16Ce | 21.2 |
| Sn-7.5In-0.16Ce | 13.1 |
| Sn-10.5In-0.16Ce | 13.9 |
| Sn-11.5In-0.16Ce | 16.2 |
| Sn-12In-0.16Ce | 24.6 |
| Sn-13In-0.16Ce | 21.5 |
| Sn-40In-0.016Ce | 17.3 |

Figure 12

| Alloy | Ductility (%) |
|---|---|
| Sn-14.7In | 13.5 |
| Sn-14.7In-0.27Nd | 14.1 |
| Sn-14.7In-0.135Nd | 12.8 |
| Sn-14.7In-0.068Nd | 15.5 |
| Sn-14.7In-0.034Nd | 16.2 |
| Sn-14.7In-0.01Nd | 21.7 |
| Sn-14.7In-0.005Nd | 20.1 |
| Sn-14.7In-0.002Nd | 21.1 |

Figure 13

| Alloy | Ductility (%) |
|---|---|
| Sn-14.7In | 13.5 |
| Sn-14.7In-0.37La | 10.7 |
| Sn-14.7In-0.1La | 22.6 |
| Sn-14.7In-0.01La | 15.5 |

Figure 14

TECHNIQUE FOR INCREASING THE COMPLIANCE OF TIN-INDIUM SOLDERS

CROSS-REFERENCE TO RELATED APPLICATIONS

This patent application claims priority to U.S. Provisional Patent Application No. 60/712,175, filed Aug. 30, 2005, which is hereby incorporated by reference herein in its entirety.

FIELD OF THE DISCLOSURE

The present disclosure relates generally to electrically conductive solders and, more particularly, to a technique for increasing the compliance of tin-indium solders.

BACKGROUND OF THE DISCLOSURE

Recently, due to environmental and health concerns over lead containing solder alloys, electronic and semiconductor industries have been rapidly converting to lead free solders. Among lead free solder alloys, tin-silver-copper (Sn—Ag—Cu) alloys have been considered the most promising. However, tin-silver-copper (Sn—Ag—Cu) alloys typically have a high liquidus temperature (i.e., equal or greater than 217° C., which is approximately 34° C. greater than the eutectic temperature of tin-lead solder alloys (e.g., Sn63Pb37)). Such a high liquidus temperature may result in thermal damage to electronic components and printed wiring boards (PWB), thereby resulting in yield loss and reduced reliability. Therefore, alloys (e.g., Sn—Zn, Sn—Ag—In, and Sn—Ag—Cu—In alloys) with lower liquidus temperatures (e.g., about 193-213° C.) have been considered more suitable than tin-silver-copper (Sn—Ag—Cu) alloys for applications sensitive to damage due to thermal excursions.

Unfortunately, tin-zinc (Sn—Zn), tin-silver-indium (Sn—Ag—In), and tin-silver-copper-indium (Sn—Ag—Cu—In) alloys tend to exhibit too great a yield strength and brittleness and thus have been deemed unsuitable for next generation electronic and semiconductor devices. Such next generation electronic and semiconductor devices employ brittle and porous low dielectric materials in silicon chips and thus require the ability to withstand significant impact and shock due to increasing popularity of portable electronic devices such as the cellular phones, personal data assistants (PDA), laptop computers, etc. In view of the above-cited issues, there has been a strong interest in developing low temperature compliant lead free solders for these demanding applications.

In particular, there has been an interest in developing a low liquidus temperature alloy having a compliance that is comparable to that of lead containing solder alloys such as, for example, Pb95Sn5, which was traditionally the most widely used compliant solder in the semiconductor and electronic industries. To that effect, alloy compositions, as well as methods of application, of tin-indium (Sn—In) alloys have been explored. These explorations revealed that solder compositions of 85-96% tin and 4-15% indium underwent a Martensitic transformation to provide ductile interconnects for flip chip applications. Other explorations further revealed that doping could refine solder grain size to retain a fine grain structure and result in superplasticity after significant thermal cycling in a semiconductor package. However, even with doping to achieve a fine grained tin-indium (Sn—In) solder and thus superplasticity, these tin-indium (Sn—In) solders still exhibited too low a compliance and too high a yield strength (i.e., 3400-3800 psi, or approximately 36-150% greater than that of Pb95Sn5, which has a yield strength of 2500 psi). In order to withstand high stresses generated by large mismatches of thermal expansion between a silicon chip and an organic substrate, and to withstand impacts occurred in portable devices due to dropping and mishandling, low yield strength is probably preferred. For example, an alloy with higher yield strength could transmit stresses to a silicon chip and cause fractures in the silicon chip, instead of relieving stresses by plastic deformation.

In view of the foregoing, it would be desirable to provide a technique for providing low temperature lead free alloys which overcomes the above-described inadequacies and shortcomings.

SUMMARY OF THE DISCLOSURE

A technique for increasing the compliance of tin-indium solders is disclosed. In one particular exemplary embodiment, the technique may be realized as a lead free solder alloy comprising from about 58.0% to about 99.998% by weight tin, from about 0.001% to about 40.0% by weight indium, and from about 0.001% to about 2.0% by weight at least one rare earth element.

In accordance with other aspects of this particular exemplary embodiment, the at least one rare earth element may be selected from the group consisting of cerium (Ce), lanthanum (La), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), actinium (Ac), thorium (Th), protactinium (Pa), and combinations thereof.

In accordance with further aspects of this particular exemplary embodiment, the lead free solder alloy may further comprise from about 0.01% to about 3.0% by weight at least one dopant selected from the group consisting of copper (Cu), iron (Fe), cobalt (Co), zinc (Zn), nickel (Ni), germanium (Ge), phosphorus (P), antimony (Sb), silver (Ag), aluminum (Al), bismuth (Bi), platinum (Pt), tellurium (Te), and combinations thereof.

In accordance with additional aspects of this particular exemplary embodiment, the lead free solder alloy may comprise at most about 94.999% by weight tin.

In accordance with still additional aspects of this particular exemplary embodiment, the lead free solder alloy may comprise at least about 71.7% by weight tin.

In accordance with still additional aspects of this particular exemplary embodiment, the lead free solder alloy may comprise at most about 28.0% by weight indium.

In accordance with still additional aspects of this particular exemplary embodiment, the lead free solder alloy may comprise at least about 5.0% by weight indium.

In accordance with still additional aspects of this particular exemplary embodiment, the lead free solder alloy may comprise at most about 0.3% by weight at least one rare earth element.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 1 shows selected tin-indium alloys exhibiting yield strengths of between about 2200 and about 6100 psi.

FIG. 2 shows a table listing the yield strengths of a tin-indium (Sn—In) alloy and rare earth element doped tin-indium (Sn—In) alloys in accordance with an embodiment of the present disclosure.

FIG. 5 shows a table revealing that the ductility of tin-indium (Sn—In) alloys doped with cerium (Ce), neodymium (Nd), and lanthanum (La) in accordance with an embodiment of the present disclosure is superior to the ductility of un-doped tin-indium (Sn—In) alloys.

FIG. 6 shows a table listing the yield strengths of a tin-indium alloy (Sn-13In) and cerium (Ce) doped tin-indium (Sn—In) alloys in accordance with an embodiment of the present disclosure.

FIG. 7 shows a table listing the yield strengths of a tin-indium alloy (Sn-14.7In) and neodymium (Nd) doped tin-indium (Sn—In) alloys in accordance with an embodiment of the present disclosure.

FIG. 8 shows a table listing the yield strengths of a tin-indium alloy (Sn-13In) and neodymium (Nd) doped tin-indium (Sn—In) alloys in accordance with an embodiment of the present disclosure.

FIG. 9 shows a table listing the yield strengths of a tin-indium alloy (Sn-14.7In) and lanthanum (La) doped tin-indium (Sn—In) alloys in accordance with an embodiment of the present disclosure.

FIG. 10 shows a table listing the yield strengths of a tin-indium alloy (Sn-20In) and both cerium (Ce) and neodymium (Nd) doped tin-indium (Sn—In) alloys in accordance with an embodiment of the present disclosure.

FIG. 11 shows a table listing the yield strengths of a tin-indium alloy (Sn-13In) and cobalt (Co) doped tin-indium (Sn—In) alloys in accordance with an embodiment of the present disclosure.

FIG. 12 shows a table listing the ductility of cerium (Ce) doped tin-indium (Sn—In) alloys in accordance with an embodiment of the present disclosure.

FIG. 13 shows a table listing the ductility of a tin-indium alloy (Sn-14.7In) and neodymium (Nd) doped tin-indium (Sn—In) alloys in accordance with an embodiment of the present disclosure.

FIG. 14 shows a table listing the ductility of a tin-indium alloy (Sn-14.7In) and lanthanum (La) doped tin-indium (Sn—In) alloys in accordance with an embodiment of the present disclosure.

DETAILED DESCRIPTION OF EXEMPLARY EMBODIMENTS

The present disclosure sets forth an unexpected discovery regarding the effect of rare earth elements on the yield strength of tin-indium alloys. That is, present disclosure describes how a doping of rare earth elements, such as, for example, cerium (Ce), neodymium (Nd), and lanthanum (La), of up to 2 wt. % to tin-indium alloys results in a significant reduction of the yield strength of the tin-indium alloys.

Figure 1:
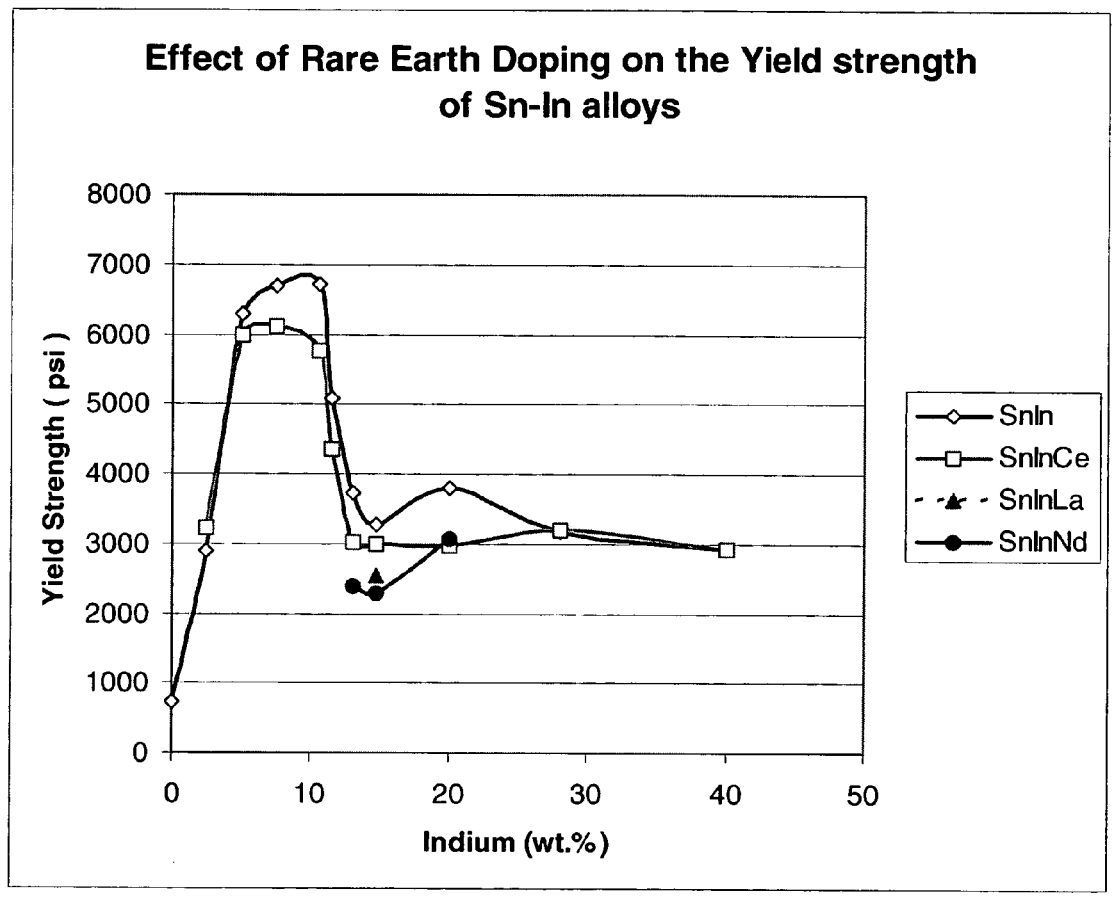
FIG. 1 shows a graph revealing the effect of rare earth doping on the yield strength of tin-indium (Sn—In) alloys in accordance with an embodiment of the present disclosure.

Referring to FIG. 1, there is shown a graph revealing the effect of rare earth doping on the yield strength of tin-indium (Sn—In) alloys in accordance with an embodiment of the present disclosure. In the graph of FIG. 1, average yield strength data was obtained from at least 5 dumbbell specimens using tensile test equipment. The strain rate of the tensile testing was measured to be 0.0017/sec. FIG. 1 shows selected tin-indium alloys exhibiting yield strengths of between about 2200 and about 6100 psi.

Referring to FIG. 2, there is shown a table listing the yield strengths of a tin-indium (Sn—In) alloy and rare earth element doped tin-indium (Sn—In) alloys in accordance with an embodiment of the present disclosure. The rare earth element doped tin-indium (Sn—In) alloys listed in the table of FIG. 2 were doped with the rare earth elements cerium (Ce), neodymium (Nd), and lanthanum (La). The graph of FIG. 1 and the table of FIG. 2 clearly indicate the effect of rare earth element doping in reducing yield strength in tin-indium (Sn—In) alloys. In the case of cerium (Ce) doping, the effect became more significant when the concentration of In was approximately or greater than 5%, and became less effective when the concentration of In was approximately or greater than 28%. In the cases of neodymium (Nd) and lanthanum (La) doping, good results were achieved at the same range of tin-indium (Sn—In) alloy compositions.

Figure 3:
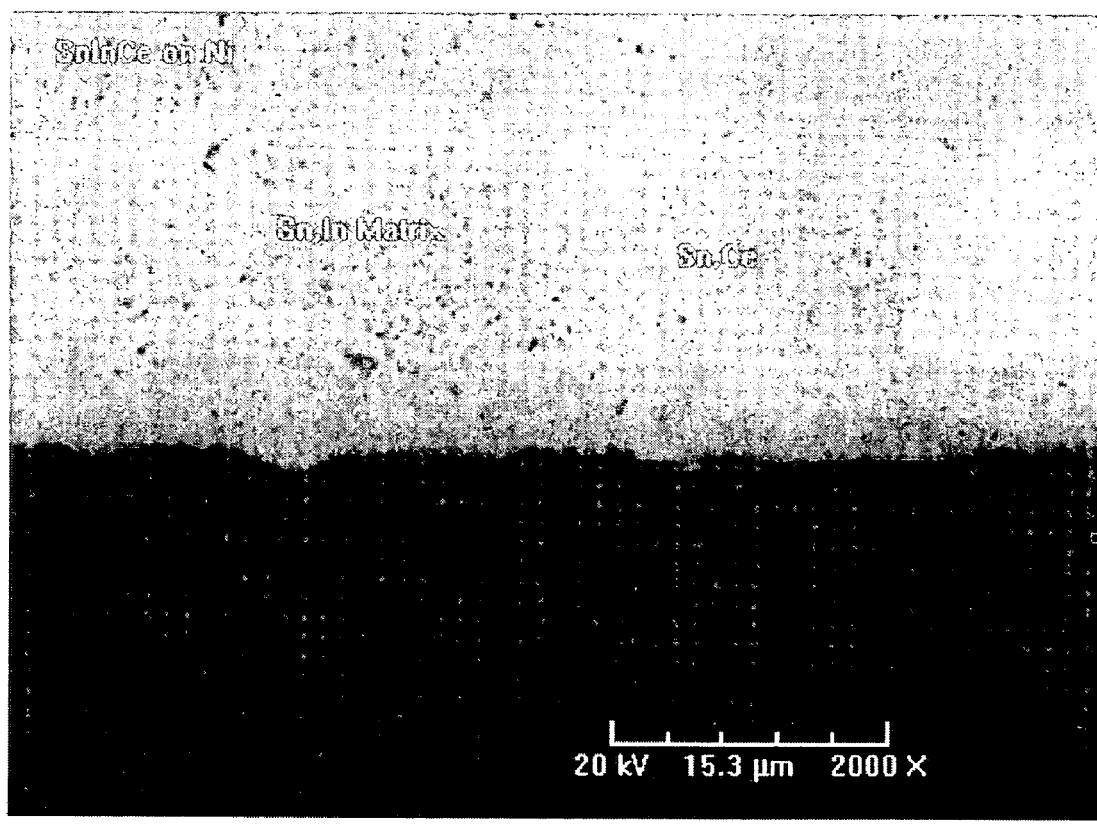
FIG. 3 shows a micrograph of a Sn-13In-0.16Ce solder alloy having tin-cerium (Sn—Ce) particles in a matrix of γ intermediate phase in accordance with an embodiment of the present disclosure.

In order to further understand the mechanism that results in the unexpected decrease of yield strength by doping rare earth elements to tin-indium (Sn—In) alloys, microstructural analysis using scanning electron microscopy (SEM) and energy dispersive spectroscopy (EDS) may be employed. For example, referring to FIG. 3, there is shown a micrograph of a Sn-13In-0.16Ce solder alloy having tin-cerium (Sn—Ce) particles in a matrix of γ intermediate phase in accordance with an embodiment of the present disclosure. More specifically, FIG. 3 shows a microstructure of a Sn-13In-0.16Ce solder alloy having a tin-indium (Sn—In) matrix with $CeSn_3$ particles. In this micrograph, the Sn-13In-0.16Ce solder was soldered to a pure nickel substrate.

Figure 4:
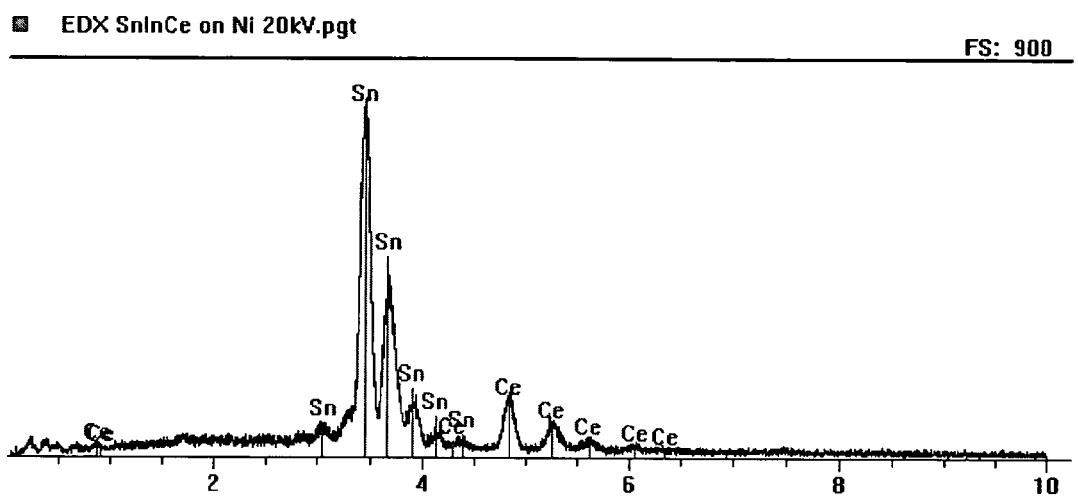
FIG. 4 shows a graph of an energy dispersive spectroscopy (EDS) that was used to identify the tin-cerium (Sn—Ce) particle shown in the micrograph of FIG. 3 as a $CeSn_3$ particle in accordance with an embodiment of the present disclosure.

The tin-cerium (Sn—Ce) particle shown in the micrograph of FIG. 3, which was obtained using scanning electron microscopy (SEM), was identified to be a $CeSn_3$ particle in a tin-indium (Sn—In) matrix, which was identified to be a γ intermediate phase using energy dispersive spectroscopy (EDS). In a phase diagram of tin-indium (Sn—In), the γ intermediate phase is an ordered structure with an indium (In) concentration of 12-28 wt. % at room temperature (see Charles E. T. White and Hioaki Okamoto, "Phase Diagrams of Indium Alloys", ASM International, 1992, p. 255). Generally speaking, an ordered structure possesses greater yield strength than that of a disordered structure of the same composition due to a strong electronegativity and valency (see David A. Porter and Kenneth E. Easterling, "Phase Transformation in Metals and Alloys", Van Nostrand Reinhold (UK) Co. Ltd., 1984, p. 24-28). It may be speculated that the yield strength of a γ intermediate phase may be reduced due to a disordering of an ordered γ intermediate phase, resulting in a structure with lower strength. In light of the above-cited mechanism, in addition to cerium (Ce), other rare earth elements may act in the same fashion to result in a reduction of yield strength and increasing compliance. Referring to FIG. 4, there is shown a graph of an energy dispersive spectroscopy (EDS) that was used to identify the tin-cerium (Sn—Ce) particle shown in the micrograph of FIG. 3 as a $CeSn_3$ particle in accordance with an embodiment of the present disclosure.

In addition to low yield strength, ductility of tin-indium (Sn—In) alloys is important for the reliability of electronic devices. For example, a ductile flip chip interconnect could accommodate a greater coefficient of thermal expansion (CTE) mismatch of a silicon chip and an organic substrate by plastic deformation. Furthermore, ductile solders could absorb more impact energy and increase the service life of an electronic device. In this respect, doping of cerium (Ce), neodymium (Nd), and lanthanum (La) to tin-indium (Sn—In) alloys results in alloys with superior ductility to that of undoped tin-indium (Sn—In) alloys. Referring to FIG. 5, there is shown a table revealing that the ductility of tin-indium (Sn—In) alloys doped with cerium (Ce), neodymium (Nd), and lanthanum (La) in accordance with an embodiment of the present disclosure is superior to the ductility of un-doped tin-indium (Sn—In) alloys. In the table of FIG. 5, Pb95Sn5 is a control alloy.

The following examples present illustrative, but non-limiting, embodiments of the present disclosure.

Example 1

Referring to FIG. 6, there is shown a table listing the yield strengths of a tin-indium alloy (Sn-13In) and cerium (Ce) doped tin-indium (Sn—In) alloys in accordance with an embodiment of the present disclosure. As shown in the table of FIG. 6, the effect in reducing the yield strength of the tin-indium alloy (Sn-13In) becomes significant when a concentration of cerium (Ce) is 0.4-0.04 wt. %. Compositions that deviate from this range result in a less effective yield strength reduction of the tin-indium alloy (Sn-13In).

Example 2

Referring to FIG. 7, there is shown a table listing the yield strengths of a tin-indium alloy (Sn-14.7In) and neodymium (Nd) doped tin-indium (Sn—In) alloys in accordance with an embodiment of the present disclosure. As shown in the table of FIG. 7, the most effective concentration range of neodymium (Nd) in doping the tin-indium alloy (Sn-14.7In) was found to be 0.01 wt. %, and deviation from 0.01 wt. % results in less reduction of yield strength.

Example 3

Referring to FIG. 8, there is shown a table listing the yield strengths of a tin-indium alloy (Sn-13In) and neodymium (Nd) doped tin-indium (Sn—In) alloys in accordance with an embodiment of the present disclosure. As shown in the table of FIG. 8, with only 0.01 wt. % doping of neodymium (Nd), the yield strength of the tin-indium alloy (Sn-13In) is reduced by more than 35%.

Example 4

Referring to FIG. 9, there is shown a table listing the yield strengths of a tin-indium alloy (Sn-14.7In) and lanthanum (La) doped tin-indium (Sn—In) alloys in accordance with an embodiment of the present disclosure. As shown in the table of FIG. 9, the most effective doping concentration of lanthanum (La) was found to be at approximately 0.1 wt. % for the tin-indium alloy (Sn-14.7In). Deviation from this concentration results in only limited reduction or even a slight increase of yield strength.

Example 5

Referring to FIG. 10, there is shown a table listing the yield strengths of a tin-indium alloy (Sn-20In) and both cerium (Ce) and neodymium (Nd) doped tin-indium (Sn—In) alloys in accordance with an embodiment of the present disclosure. As shown in the table of FIG. 10, with either cerium (Ce) or neodymium (Nd) doping, the yield strength of the tin-indium alloy (Sn-20In) is significantly reduced.

Example 6

Referring to FIG. 11, there is shown a table listing the yield strengths of a tin-indium alloy (Sn-13In) and cobalt (Co) doped tin-indium (Sn—In) alloys in accordance with an embodiment of the present disclosure. Since dopants such as cobalt (Co) and iron (Fe) are known to refine the microstructure of an interfacial intermetallic compound (see I. E. Anderson, B. A. Cook, and R. L. Terpstra, "Microstructural Modifications and Properties of Sn—Ag—Cu Solder Joints Induced by Alloying", Journal of Electronic Materials, Vol. 31, No. 11, 2002, p. 1168-1174) so as to prevent interfacial brittleness between a solder and an under bump metallization (UBM) of a silicon chip, further modification of compositions of rare earth element doped tin-indium (Sn—In) alloys with cobalt (Co) and iron (Fe) may be employed. As shown in the table of FIG. 11, doping of cobalt (Co) to un-doped and rare earth element doped tin-indium (Sn—In) alloys has results in compositions with desirable low yield strength.

Example 7

Referring to FIG. 12, there is shown a table listing the yield strengths of cerium (Ce) doped tin-indium (Sn—In) alloys in accordance with an embodiment of the present disclosure. As shown in the table of FIG. 12, the ductility of the 0.06-0.16 wt. % cerium (Ce) doped tin-indium (Sn—In) alloys with varying indium concentration was found to be comparable to that of Pb95Sn5 solder, which has a ductility of 16.1%.

Example 8

Referring to FIG. 13, there is shown a table listing the yield strengths of a tin-indium alloy (Sn-14.7In) and neodymium (Nd) doped tin-indium (Sn—In) alloys in accordance with an embodiment of the present disclosure. As shown in the table of FIG. 13, doping approximately 0.002-0.01 wt. % of neodymium (Nd) to the tin-indium alloy (Sn-14.7In) results in a significant increase of the ductility of the tin-indium alloy (Sn-14.7In).

Example 9

Referring to FIG. 14, there is shown a table listing the yield strengths of a tin-indium alloy (Sn-14.7In) and lanthanum (La) doped tin-indium (Sn—In) alloys in accordance with an embodiment of the present disclosure. As shown in the table of FIG. 14, doping 0.1 wt. % lanthanum (La) to the tin-indium alloy (Sn-14.7In) results in a significant increase of the ductility of the tin-indium alloy (Sn-14.7In). Deviation from this composition results in a lowering of the ductility.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A lead free compliant solder alloy consisting of from about 58.0% to about 94.999% by weight tin, from about 5.0% to about 40.0% by weight indium, from about 0.001% to about 2.0% by weight at least one rare earth element and about 0.01% to about 0.6% by weight at least one dopant selected from the group consisting of Fe, Co, and Ge, and combinations thereof.

2. The lead free compliant solder alloy of claim 1, wherein the at least one rare earth element is selected from the group consisting of Ce, La, Pr, Nd, Pm, Sm, Eu, Gd, Tb, Dy, Ho, Er, Tm, Yb, Lu, Ac, Th, Pa, and combinations thereof.

3. The lead free compliant solder alloy of claim 1, wherein the lead free solder alloy comprises at least about 71.7% by weight tin.

4. The lead free compliant solder alloy of claim 1, wherein the lead free solder alloy comprises at most about 28.0% by weight indium.

5. The lead free compliant solder alloy of claim 1, wherein the lead free solder alloy comprises at most about 0.3% by weight at least one rare earth element.

6. A lead free compliant solder alloy consisting of from about 58.0% to about 94.999% by weight tin, from about 5.0% to about 40.0% by weight indium, and from about 0.001% to about 2.0% by weight at least one rare earth element.

7. The lead free compliant solder alloy of claim 6, wherein the at least one rare earth element is selected from the group consisting of Ce, La, Pr, Nd, Pm, Sm, Eu, Gd, Tb, Dy, Ho, Er, Tm, Yb, Lu, Ac, Th, Pa, and combinations thereof.

* * * * *